(12) United States Patent
Andrieu et al.

(10) Patent No.: US 7,088,896 B2
(45) Date of Patent: Aug. 8, 2006

(54) METHOD OF IDENTIFYING OPTICAL FIBERS IN A CABLE

(75) Inventors: Xavier Andrieu, Bretigny sur Orge (FR); Jean-François Libert, Condette (FR); Anne Decaumont, Bretigny sur Orge (FR)

(73) Assignee: Alcatel, Paris (FR)

( * ) Notice: Subject to any disclaimer, the term of this patent is extended or adjusted under 35 U.S.C. 154(b) by 171 days.

(21) Appl. No.: 10/386,717

(22) Filed: Mar. 13, 2003

(65) Prior Publication Data

US 2003/0174990 A1 Sep. 18, 2003

(30) Foreign Application Priority Data

Mar. 14, 2002 (FR) ............................................ 02 03166

(51) Int. Cl.
*G02B 6/02* (2006.01)

(52) U.S. Cl. .................... 385/128; 385/100; 385/114
(58) Field of Classification Search ................ 385/100, 385/114, 128
See application file for complete search history.

(56) References Cited

U.S. PATENT DOCUMENTS

| 5,377,292 A | * | 12/1994 | Bartling et al. ............. 385/128 |
| 5,379,363 A | * | 1/1995 | Bonicel et al. ............. 385/114 |
| 5,796,905 A |   | 8/1998 | Hoffart et al. |
| 6,175,677 B1 | * | 1/2001 | Yang et al. .................. 385/114 |
| 6,370,304 B1 |   | 4/2002 | Mills et al. |
| 2001/0048797 A1 |   | 12/2001 | Van Dijk et al. |

FOREIGN PATENT DOCUMENTS

| FR | 2648270 A1 | 12/1990 |
| WO | WO 02/086563 A2 | 10/2002 |

OTHER PUBLICATIONS

Patent Abstracts of Japan, vol. 2000, No. 07, Sep. 29, 2000 corresponding to JP 2000 105328 A (Siecor Operations LLC) dated Apr. 11, 2000.

* cited by examiner

*Primary Examiner*—John R. Lee
*Assistant Examiner*—Paul M. Gurzo
(74) *Attorney, Agent, or Firm*—Sughrue Mion, PLLC

(57) ABSTRACT

An optical fiber includes a primary covering layer, a secondary covering layer transparent to a laser beam, an intermediate covering layer less than 100 nm thick between the primary covering layer and the secondary covering layer and including a coloring element whose coloring properties can be modified by using the laser beam to irradiate the intermediate covering layer to write data.

18 Claims, No Drawings

METHOD OF IDENTIFYING OPTICAL FIBERS IN A CABLE

CROSS-REFERENCE TO RELATED APPLICATIONS

This application is based on French Patent Application No. 02 03 166 filed Mar. 14, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to identifying optical fibers, for example optical fibers in an optical cable. An optical cable can contain a large number of optical fibers, for example several hundred optical fibers in the case of a an optical system transmission cable.

2. Description of the Prior Art

An optical fiber conventionally comprises an optical core, whose function is to transmit and possibly to amplify an optical signal, surrounded by an optical cladding, whose function is to confine the optical signal within the core. The optical fiber is protected by a covering, generally of polymer resin, whose function is firstly to protect the fiber during handling and installation in an optical system and secondly to limit deterioration of the fiber and drift in its optical characteristics over time.

An individual optical fiber placed in an optical cable of a transmission line of a given optical system must be identifiable, either for connection purposes when installing the system or for checking purposes in the event of tests or system reconfiguration. Furthermore, in the case of a dense wavelength division multiplexing (DWDM) transmission optical system, managing the chromatic dispersion of each optical fiber of a transmission line becomes critical and it is important for each fiber of a cable, with its optical dispersion characteristics, to be accurately identified, because connection errors cannot be tolerated in this kind of system.

There is therefore a real need for a fast and certain method of identifying each optical fiber in an optical cable.

One conventional solution to identifying the fibers in a cable, in particular for the purposes of connecting the cable to an access network, is to use a color code. The polymer covering of each fiber is colored, at least in an end portion of the fiber, each color corresponding to a fiber type. The covering can be colored either directly, by adding pigments or dyes to the formula of the resin, or by applying a colored layer to the covering. A dozen colors have been standardized.

This technique has drawbacks, however. The number of colors that can be used to color the resin of the covering is limited and insufficient to identify all the fibers in a cable. Fibers with a colored covering are usually placed in tubes of different colors inside the cable, which increases the number of identifying color combinations. This technique is complicated, however, and liable to manipulation and interpretation errors.

Another prior art technique for identifying optical fibers in a cable adds colored rings to the ends of the fibers. This solution, which is sometimes combined with the previous one, increases the number of identifying color codes, but the number nevertheless remains insufficient. Furthermore, adding a ring around the fiber introduces a mechanical stress that can modify the local optical properties of the fiber, which can be harmful if the transmission windows are very tightly packed.

What is more, none of the prior art solutions for identifying optical fibers in a cable can mark a fiber with an accurate record of the fiber or identify separately different portions of the same fiber. Coloring the covering or applying a ring may indicate the fiber type or state at a given time, but does not indicate any change in the characteristics of the fiber.

Furthermore, color codes cannot prevent errors of interpretation by technicians manipulating the cable, who have to consult correspondence tables to recognize the colored fibers.

An objective of the invention is to address the problems and limitations of the prior art previously referred to.

To this end, the invention proposes to identify a fiber directly in its covering by laser marking a coloring element disposed in the covering. Laser marking has the advantage of inscribing an identifying code on the fiber by localized modification of the coloring properties of the coloring element.

The invention also proposes an easy, reliable and powerful method of identifying optical fibers in a cable.

SUMMARY OF THE INVENTION

To be more specific, the invention provides an optical fiber including a primary covering layer, a secondary covering layer transparent to a laser beam, an intermediate covering layer less than 100 nm thick between the primary covering layer and the secondary covering layer and including a coloring element whose coloring properties can be modified by using the laser beam to irradiate the intermediate covering layer to write data.

The coloring element is disposed in an intermediate layer between a primary covering layer and a secondary covering layer which is transparent to the laser beam and protects the intermediate covering layer.

According to one feature, the coloring element is a ThermoChrome dye, such as a material based on cyanine or phthalocyanine. According to one feature, the coloring element constitutes from 0.1% by weight to 10% by weight of all of the substances of the covering layers.

Depending on the application, the data that is written comprises bar codes or visual codes that are permanent and/or coded and/or incremental.

The invention also provides an optical cable including an optical fiber according to the invention.

The invention further provides a method of identifying an optical fiber according to the invention, including a laser marking step for writing data by irradiating the intermediate covering layer of the fiber using a laser beam to modify the coloring properties of the coloring element.

Depending on the applications, the data is written several times on the same fiber, in adjacent areas of the same fiber, or in different portions of the same fiber.

According to one feature, the method according to the invention further includes using a laser reader to read data written on the intermediate covering layer of the fiber.

The invention also provides a method of identifying optical fibers in a cable when each fiber has an intermediate covering layer including a coloring element, which method further includes a laser marking step for writing data, the intermediate covering layer of at least one of the fibers being irradiated by a laser beam to modify the coloring properties of the coloring element.

The invention has many advantages compared to the prior art fiber identification techniques. It accurately identifies fibers or fiber portions of the same cable, there being many more data combinations in a code (bar code or Morse code) than in any combination of one color per fiber color codes.

Furthermore, errors of interpreting the marking are limited by the facility of using a laser reader to identify fibers marked with a bar code.

Moreover, marking a fiber by a method according to the invention does not damage the polymer of the coating and does not interfere with the optical properties of the fiber.

DETAILED DESCRIPTION OF PREFERRED EMBODIMENTS

Other features and advantages of the invention will emerge more clearly from the following description.

The objective of the present invention is to identify accurately an optical fiber or fiber portion, in particular when it is installed in a cable.

Accordingly, in accordance with the invention, a coloring element is disposed in an intermediate covering layer of the fiber and is chosen so that its coloring properties can be modified by laser irradiation.

Laser marking, i.e. irradiating a coloring element with a laser beam, is already known in the art for identifying electrical or optical cables. Laser marking of cables is widely used. For example, U.S. Pat. No. 5,111,523 discloses a cable whose covering can be laser marked. The covering of the cable comprises an external layer and an internal layer, one layer being colored relative to the other. A first laser beam destroys the external layer to expose the internal layer, which is a different color from the external layer, and a second laser beam irradiates the dye of the internal layer to modify its coloring properties. This increases the number of color code combinations.

However, laser marking a cable is not subject to the same constraints as laser marking an optical fiber. The covering thicknesses are not comparable and the covering of a cable can be locally damaged without significantly interfering with the electrical or optical properties of the wires or fibers that it contains.

Laser marking, i.e. irradiating a coloring element with a laser beam, is already known in the art for identifying optical fibers. U.S. Pat. No. 6,370,304 discloses laser marking of the secondary covering layer common to the optical fibers of a ribbon. However, there are only one primary layer and one secondary layer common to all of the optical fibers, the exterior surface of the common secondary covering layer being marked. This layer is relatively thick, since if it were relatively thin attack by the external environment would erase it or at least damage it quickly, cannot be written data quickly, for example as when writing on a high-speed production line, and requires a relatively high power laser for writing; what is more, the written data is located with relatively poor accuracy and changes to the environment are relatively serious. The optical fiber and the method of the invention remedy these defects.

The present invention proposes to apply laser marking to the covering of an optical fiber, which involves special control of the marking laser beam. Thus the intermediate covering layer of the fiber is locally irradiated by a laser beam whose emission wavelength, power and frequency are chosen to modify the coloring properties of the coloring element and not to damage the polymer of the covering. Furthermore, the above three parameters associated with the laser beam are combined with a limited exposure time for each individual writing area (approximately 1 µs per 100 µm length of covering).

An advantageous feature of the invention is that laser irradiation of the covering does not damage any layer of said covering, but merely modifies the coloring properties of one layer of the covering.

Laser marking applies an identifying code to the covering of a given fiber or fiber portion. The code applied can be a visual code, such as a succession of long, short, horizontal, vertical lines, or a bar code. The code represents data specific to the fiber or fiber portions and can be interpreted by technicians using correspondence tables or a bar code reader, in particular for some applications in which the identification information is coded. Laser marking is usually permanent and does not deteriorate over time.

In one particular application, the code applied to the covering of the fiber can be incremental, i.e. comprise a root specific to the fiber and an increment corresponding to different portions of the fiber and/or different steps of fabrication or use of the fiber.

The coloring element can be made of any material whose coloring properties can be modified by laser irradiation, the choice of the laser wavelength then being fixed by the type of dye incorporated into the covering of the fiber to be identified. The dye must also remain inert during the fiber fabrication process and in particular during the step of drying the resin of the covering (at which stage the temperature can reach 120° C.).

In one embodiment, the coloring element is an irreversible ThermoChrome dye containing a material based on cyanine or phthalocyanine.

The coloring element is disposed in a relatively thin intermediate layer less than 100 nm thick between a primary, internal covering layer and a secondary, external covering layer which is transparent to the laser beam.

Thus fibers can be marked using a method in accordance with the invention and identified as follows.

Data is written on an optical fiber by using a laser beam to irradiate the intermediate covering layer of the fiber. To this end, the intermediate covering layer includes a coloring element which is absorbent at the wavelength of the marking laser. This marking step can be carried out at various stages in the fabrication and/or use of the fiber. In particular, this data writing step can be repeated several times on the same fiber, to identify different portions of the same fiber and/or to provide a record of the evolution of a fiber or fiber portion.

Data can be written on a fiber by the manufacturer of the fiber and/or by the manufacturer of an optical cable incorporating the fiber and/or by the installer when the cable is installed in an optical system.

Reading the data written on the covering of the fiber identifies said fiber or a portion thereof. In one embodiment, the identifying code written on the fiber is read using a laser reader. This considerably reduces the risks of handling and installation errors.

Similarly, an optical cable including a plurality of fibers each having an intermediate covering layer including a coloring element can undergo a step of writing data onto the intermediate covering layer of a fiber by laser marking and another step of reading data written on the intermediate covering layer of a fiber for identification purposes.

Thus information relating to each optical fiber of a cable is written directly onto the fiber. The information can provide a record, since the same fiber can be written on more than once, which improves the traceability and quality of products.

The fiber identification technique proposed by the present invention can be applied to any type of optical fiber, such as line fibers, amplifier fibers and fiber components.

What is claimed is:

1. An optical fiber including a primary covering layer, a secondary covering layer transparent to a laser beam, an intermediate covering layer less than 100 nm thick between said primary covering layer and said secondary covering layer and including a coloring element whose coloring properties can be modified by using said laser beam to irradiate said intermediate covering layer to write data; and wherein the coloring element is dispersed continuously throughout the intermediate layer.

2. The optical fiber claimed in claim 1 wherein said coloring element is a ThermoChrome dye.

3. The optical fiber claimed in claim 2 wherein said coloring element is a material based on cyanine or phthalocyanine.

4. The optical fiber claimed in claim 1 wherein said coloring element constitutes from 0.1% by weight to 10% by weight of all of the substances of said covering layers.

5. The optical fiber claimed in claim 1 wherein the data that is written comprises bar codes.

6. The optical fiber claimed in claim 1 wherein the data that is written comprises visual codes.

7. The optical fiber claimed in claim 1 wherein the data that is written is permanent.

8. The optical fiber claimed in claim 1 wherein the data that is written is coded.

9. The optical fiber claimed in claim 1 wherein the data that is written is incremental.

10. An optical cable including an optical fiber as claimed in claim 1.

11. The method claimed in claim 10 of identifying optical fibers in a cable when each fiber has an intermediate covering layer including a coloring element, which method further includes a laser marking step for writing data, said intermediate covering layer of at least one of said fibers being irradiated by a laser beam to modify the coloring properties of said coloring element.

12. The identification method claimed in claim 11, further including a step of using a laser reader to read data written on said intermediate covering layer of a fiber.

13. A method of identifying an optical fiber as claimed in claim 1, including a laser marking step for writing data by irradiating said intermediate covering layer of said fiber using a laser beam to modify the coloring properties of said coloring element.

14. The identification method claimed in claim 13 wherein the data writing step is repeated several times on the same fiber.

15. The identification method claimed in claim 14 wherein said data is written in adjacent areas of the same fiber.

16. The identification method claimed in claim 14 wherein said data is written in different portions of the same fiber.

17. The identification method claimed in claim 13, further including using a laser reader to read data written on said intermediate covering layer of said fiber.

18. An optical fiber including a primary covering layer, a secondary covering layer transparent to a laser beam, an intermediate covering layer between said primary covering layer and said secondary covering layer and including a coloring element whose coloring properties can be modified by using said laser beam to irradiate said intermediate covering layer to write data; and wherein the coloring element is dispersed continuously throughout the intermediate layer.

* * * * *